Sept. 14, 1965 F. L. HILL ETAL 3,206,011
COLLECTING CONVEYOR FOR TOMATO HARVESTER AND THE LIKE
Filed July 16, 1963
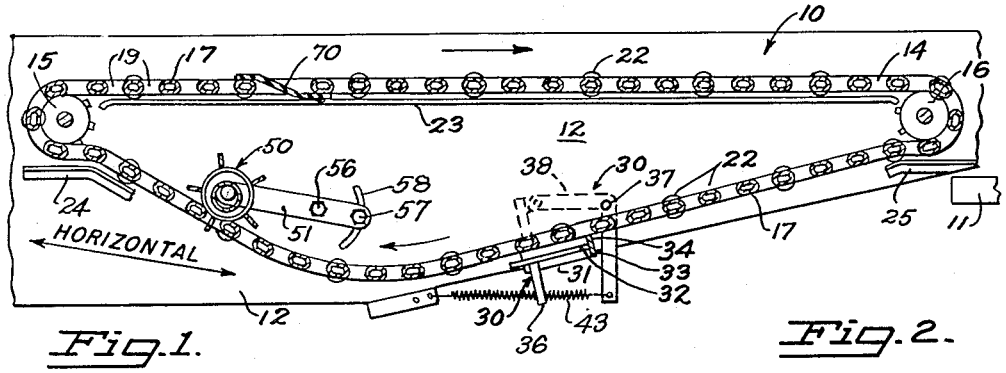
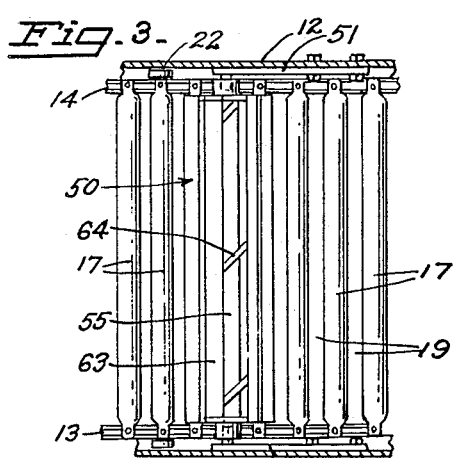
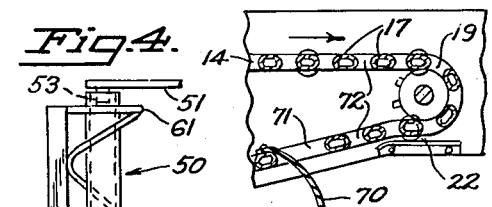
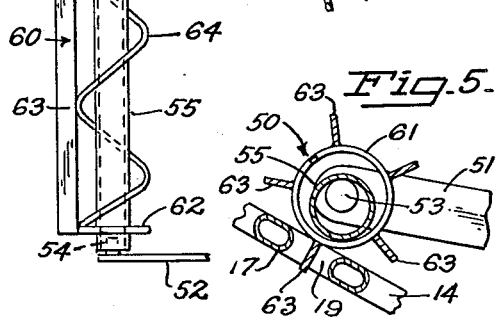
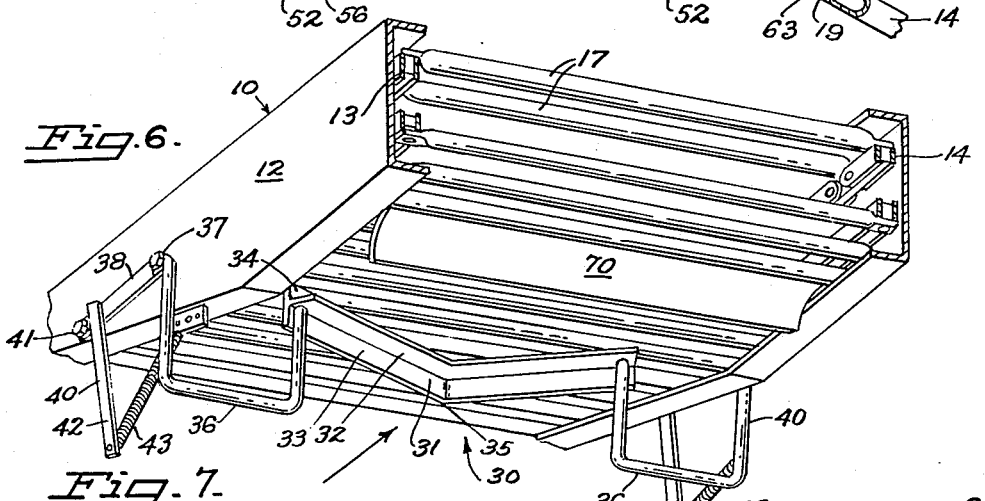
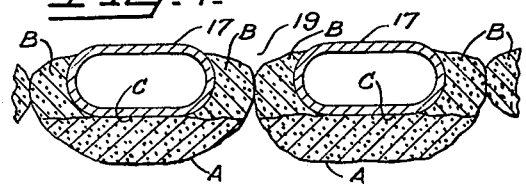
INVENTORS
FREDRICK L. HILL
LAUREN W. GATES
BY
Owen, Wickersham & Erickson
ATTORNEYS

United States Patent Office 3,206,011
Patented Sept. 14, 1965

3,206,011
COLLECTING CONVEYOR FOR TOMATO
HARVESTER AND THE LIKE
Fredrick L. Hill, 980 Linda Vista Way, and Lauren W.
Gates, General Delivery, both of Rio Vista, Calif.
Filed July 16, 1963, Ser. No. 295,382
8 Claims. (Cl. 198—230)

This invention relates to improvements in tomato harvesters and particularly to tomato harvesters of the type in which the tomato plant is severed, the entire plant is lifted by a pickup unit to a shaking unit, and the tomatoes are then shaken off the plant and the plant discarded. More particularly, the invention relates to improvements in the collecting conveyor for collecting the tomatoes that have been shaken off and carrying them for further processing.

The stems of the tomato plants are usually and preferably severed under ground. This, together with other typical field conditions, results in a rather large amount of dirt being picked up along with the tomato plants. In the shaking unit this dirt is shaken off the plants along with the tomatoes, and falls with the tomatoes and some trash onto the collecting conveyor. There it has caused difficulties, especially when somewhat moist, sticking to the conveyor and interfering with its operation. Moreover, it is desirable in any event to get rid of as much of the dirt as possible before the tomatoes are sorted and packed; so it is undesirable for the dirt to be carried along with the tomatoes. However, it has been difficult to separate them. For one thing, the dirt and trash, such as loose leaves, stem portions, straw, and so on, tend to get entangled in the collecting conveyor and to plug it, while if the conveyor is made too open, the tomatoes themselves drop through onto the ground and are lost. Moreover, the dirt may be in any of several states of wetness and when some mud is picked up, it tends to stick, and dirt and trash tend to stick to it.

The present invention provides a collecting conveyor having an improved system for ejecting dirt, mud, and trash and for preventing their buildup. As a result, it enables much improvement in the operation of the collecting conveyor.

Other objects and advantages of the invention will appear from the following description of a preferred form thereof.

In the drawings:

FIG. 1 is a view in side elevation and in section of a collecting conveyor for a tomato harvester embodying the principles of this invention, and a fragment of some of the adjacent parts. In order to conserve space the conveyor has been rotated from its true tilted position, a horizontal plane being indicated by an inclined line.

FIG. 2 is a fragmentary view of a rear end portion of the device of FIG. 1 with the endless conveyor moved to a different position, showing the operation of the dropout flap.

FIG. 3 is a fragmentary top plan view of a forward portion of the collecting conveyor showing its cleaning drum.

FIG. 4 is a top plan view of the cleaning drum of FIG. 3 with all but one of its bars removed in order to clarify its structure.

FIG. 5 is an enlarged view in side elevation of the cleaning drum and a short portion of the collecting conveyor.

FIG. 6 is a view in perspective looking at the conveyor from beneath it and from the rear end, showing the scraper.

FIG. 7 is a diagrammatic view in section of a portion of the collecting conveyor bars and dirt collected thereon, with sectioning to indicate which portion of the dirt is sheared off by the scraper and which portion is ejected by the drum.

A tomato harvester of the type with which this invention may be used has a cutting means, not shown, which severs the main stem of the tomato plant, usually below ground, and a pickup unit which picks up the severed plants and carries them upwardly and rearwardly of the harvester as the harvester moves along. The pickup unit deposits the tomato plants on a shaking device where the tomatoes are shaken off. The tomatoes along with dirt and trash fall down onto a collecting conveyor 10, while the plants are ejected from the rear end of the shaking unit. The collecting conveyor 10 moves the tomatoes upwardly at a gentle inclination, usually about 5°, to a pair of rear cross conveyors 11 which in turn transfer them to forwardly moving sorting conveyors. By the side of these sorting conveyors a number of people stand to sort out the culls and discard them. The sorting conveyors then carry the tomatoes to a front cross conveyor which in turn leads to a boom conveyor that transfers the harvested, cleaned, and sorted tomatoes to a packing truck. All these and other features are described in our earlier patent application Serial No. 148,963 filed October 31, 1961.

The harvester includes a main frame 12, a portion of which supports the collecting conveyor 10. The collecting conveyor 10 itself has two chains 13 and 14, one on each side of the conveyor 10, driven around and between front sprocket wheels 15 and rear sprocket wheels 16. Cross members 17 are attached to the chains 13 and 14. The cross members 17 are preferably flattened tubular members which are wider than they are high and they are spaced apart a distance that is closer than their larger diameter and is smaller than the diameter of the minimum size of tomatoes to be caught. The openings 19 are kept close to that size so that they are far enough apart to enable passage of dirt and various debris through the conveyor 10. This spacing also enables the conveyor 10 to catch the tomatoes in the spaces between the succeeding cross members 17 and to carry them upwardly, using these cross members 17 and spaces 19 somewhat as flights of a flighted conveyor. Some of the cross members carry rotatable rollers 22, preferably of nylon or similar plastic. These rollers 22 roll on rails 23 on the upper flight and support the weight of the conveyor 10 and the tomatoes on that upper flight, while the chains 13 and 14 merely advance and move the conveyor 10 and do not have to provide any support function. The rollers 22 also ride on short rails 24, 25 at each end of the lower flight to provide some support there. The conveyor moves rearwardly and upwardly on its upper run, being tilted gently at about 5° (see the line in FIG. 1 indicating the horizontal). On the lower run there is a wide gap between the tracks 24 and 25 where the conveyor 10 is slack, its path dropping, since unsupported, thereby automatically taking up by gravity the added slack caused by the gradual wear of the chains 13 and 14.

The present invention provides several different cleaning mechanisms, but they all cooperate with each other to keep the collecting conveyor clean; each of them has a specific function to get rid of a particular portion of the dirt. One is a scraper unit 30 that scrapes off a dirt layer A (see FIG. 7) which accumulates on top of the bars 17 during the conveyor's upper run, being on the bottom during the lower run. Another is a rotating drum unit 50 with bars 63 that force out a dirt layer B (see FIG. 7) which tends to accumulate in between succeeding bars 17. Finally, there is a drop-out flap 70 to let accumulated trash fall out. These will now be explained in turn.

*The scraper unit 30.*—As the conveyor 10 moves down on its lower run, the scraper unit 30 engages it with a V-shaped blade 31. As shown in FIG. 7, the blade 31 engages lower surfaces C of the conveyor bars 17 (which are the upper surfaces on the upper run) where mud and dirt tend to build up the layer A as it falls on them from the shaker. The blade 31 is preferably T shaped, having a generally horizontal portion 32 extending rearwardly from its vertical scraping cross-bar 33, where its edge 34 is set to engage the bars 17. The blade 31 is not sharp but dull, and its inclination toward a vertex 35 helps to prevent damage to the bars 17 while it meets and scrapes off the dirt layer A, shown in FIG. 7. The V-shape assures that the mud and dirt that are peeled off move rearwardly, away from the vertex 35, this movement helping to loosen the peeled-off dirt from the blade 31. It also offers better shear and provides less resistance to movement than would a straight-across blade, and it enables the blade 31 to follow the shape of the conveyor 10 better.

The blade 31 is secured at each end to a U-shaped rod 36, which is secured by a very loose and sloppy pivot 37 to an arm 38 of a crank 40. The crank 40 is piovtally secured to the frame 12 by a connection 41 and has an arm 42 at a right angle to the arm 38. A tension spring 43 connects the end of the arm 42 to the frame 12. The pull of the spring 43 yieldably urges the scraper blade 31 against the bars 17. The pivot 37 is very loose so that the blade 31 can tilt and float in any direction to accommodate deformation of the bars 17 or other things, while still being held in maximum contact with the bars 17.

*The drum assembly 50.*—On the latter half of its lower run the conveyor 10 (which has had the layer A of dirt cleaned off by the scraper blade 31) is engaged by a cleaning drum assembly 50 which ejects the dirt B (FIG. 7) from the space 19 between the successive bars 17. This drum 50 (see FIGS. 1, 3, 4, and 5) is of novel construction. At each end is a support arm 51, 52 to which is secured a stub shaft 53, 54 that very loosely supports a tube 55. There is considerable play up and down between the tube 55 and the shafts 53 and 54. Each arm 51, 52 pivots at 56, where it is supported by the frame 12, and an outboard end has a bolt 57, that is secured at any desired point in a arcuate slot 58, to locate the stub shafts 53, 54 at a desired position, enabling a change as the conveyor 10 wears and becomes looser.

Around the tube 55 is a cleaner assembly 60, which includes a pair of end rings 61 and 62. The rings 61 and 62 are not secured to either the tube 55 nor the arms 51, 52, though they are limited in sidewise movement by the arms 51, 52. A plurality of flat bars 63 (usually five of them) extend across between the rings 61 and 62 and are welded to them. The bars 63 go across the full width of the conveyor 10 and their flat surfaces extend radially. Their inner edges are welded in a few places to a helical bar 64 that extends through them (see FIG. 4) and is welded at each end to the rings 61, 62. The inner diameter of the helical bar 64 is still much larger than the outer diameter of the tube 55, so the assembly 60 floats on the tube 55. Therefore, it can rise and fall a limited distance while the tube 55 remains stationary, and then both the assembly 60 and the tube 55 can rise relative to the loose-fitting stub shafts 53, 54.

The bolts 57 are set to let the bars 63 go down in between successive bars 17 while the assembly 50 rides gently over the bars 17 but does not force them down. The bars 63 and 64 then are driven by the conveyor 10 and float up and down while still bearing the bars 64 down into and through the spaces 19 to force out the dirt B from between the bars 17.

*The flap 70.*—A third cleaning feature is provided by a flap 70 which is secured to one bar 17. The flap 70 is made from elastomeric material and the succeeding bar 17 is omitted, the flap 70 being made so that it rests on top of the following bar 17 on the upper run and then opens on the lower run. When it opens, accumulated trash can fall out. It has been found that this trash gravitates to the forward end of the conveyor 10 and that it will fall out the wide opening 71 (FIG. 2)—the opening 71 is three times as wide as the ordinary spaces 72 between the successive bars 17—when the flap 70 falls down to the position shown in FIG. 2.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. In a tomato harvester, the combination of:
   a collecting conveyor upon which tomatoes fall along with dirt and trash, said conveyor having a main frame and an endless belt comprising a series of parallel spaced-apart lateral bars, said belt having an inclined upper flight and a slack lower flight, said belt and its bars having inner and outer surfaces,
   said conveyor having one said bar omitted and a flexible, readily yielding resilient flap secured to the inner surface of the bar on the forward side of the resultant space and bridging it and resting loosely on top of the outer surface of the succeeding bar on its passage along said upper flight, said flap falling down loosely during said lower flight to open said space so that accumulated trash can fall out therethrough,
   a scraper blade that is V-shaped as seen in plan, extending across said belt with the V along the belt center and beneath it on said lower flight, the space bounded by the V and the space outside the V being open,
   means secured to said frame for holding said scraper blade yieldingly against said belt with the vertex forward and side portions extending rearwardly away therefrom, said scraper scraping off a layer of collected dirt from said belt, said flap yielding upwardly when engaged by said scraper, and
   a cleaning drum assembly supported rotatably with respect to said frame in between said flights and forward of said blade for later engagement with the lower flight of said belt, said drum having a plurality of radially extending flat lateral bars and gravity-actuated means for causing said lateral bars to enter down into the spaces between successive said conveyor bars and force out dirt from between them,
   whereby loose trash trapped between flights is ejected by gravity when said flap opens, the outer surface of the lower flight of the belt is scraped off, the resiliency of the flap and its protected securement to its bar preventing damage thereto when it is scraped, and then the dirt and mud stuck between conveyor bars and remaining after scraping is ejected downwardly by said drum.

2. The combination of claim 1 wherein said means for holding said scraper blade comprises
   a pair of cranks, each pivoted to the outside of said frame adjacent a crank vertex, each crank having two arms extending at approximately right angles to each other from said vertex,
   a spring in tension connecting one said arm of each crank to said frame, and
   a U-shaped bar conected to the other said arm of each crank and extending down below and up inside said frame,
   said scraper blade being held yieldingly by said springs against said conveyor bars while the space bounded by it and around it next to the conveyor bars is kept open.

3. In a tomato harvester, the combination of:
   a collecting conveyor upon which tomatoes fall along with dirt and trash, said conveyor having a main frame and an endless belt comprising a series of parallel spaced-apart lateral bars, said belt having an inclined upper flight and a slack lower flight, said belt and its bars having inner and outer surfaces, said conveyor having one said bar omitted and a flexible, readily yielding resilient flap secured to the inner surface of the bar on the forward side of the resultant space and bridging it and resting loosely on top of the outer surface of the succeeding bar on its passage along said upper flight, said flap falling down loosely during said lower flight to open said space so that accumulated trash can fall out therethrough, a V-shaped scraper blade extending at an angle across and beneath the lower flight of said belt with the V along the belt center and located where it engages the belt before the remainder of the blade, the space bounded by and outside said blade being open adjacent said belt, means secured to said frame for holding said scraper blade yieldingly against said belt, said scraper blade scraping off a layer of collected dirt from said belt, whereby loose trash trapped between said flights is periodically ejected by gravity when said flap opens, while the outer surface of the belt is scraped clean by said blade, the resiliency of the flap and its protected securement preventing damage thereto when it is scraped.

4. In a tomato harvester, the combination of
a collecting conveyor upon which tomatoes and dirt and trash fall, said conveyor having a main frame, an endless belt made up of propelling means at the sides and a series of parallel spaced apart flattened tubes extending across between said propelling means, said belt having an upper inclined flight and a lower slack flight, a conveyor scraper supported by said frame to engage the lower flight of said conveyor and comprising a pair of cranks pivoted to the outside of said main frame adjacent a vertex and each having two arms at approximately right angles to each other, a spring in tension connecting one said arm of each crank to said frame, a U-shaped bar connected to the other said arm of each crank and extending down below and up inside said frame, and a scraper blade extending across between said arms, said scraper blade being held by said springs against said flattened tubes and having a central forward vertex and two angle portions leading away therefrom, a cleaning drum further along on said lower slack flight and comprising a pair of side bars pivotally and adjustably secured to the inside of said frame and having stub shafts, a tube riding very loosely on said stub shafts and extending across said belt above said belt's lower flight, a pair of rings, one at each end of said tube but larger than it and not connected to it, a series of flat bars extending widthwise across said rings and secured to them and extending radially with respect to said rings, and a helical bar connected to the inner periphery of said flat bars and to said rings and having an inner periphery greater than that of said tube so as to ride loosely thereon with considerable play, whereby said cleaning drum floats on said tube and its bars enter the spaces between successive flattened tubes of said conveyor said conveyor having one bar omitted and a rubber flap secured to the bar on the forward side of the resultant space and resting loosely on top of the succeeding bar on the rear ends of the space during the upper run but opened during the lower run.

5. In a tomato harvester, the combination of
a collecting conveyor upon which tomatoes and dirt and trash fall, said conveyor having a main frame, an endless belt made up of propelling means at the sides and a series of parallel spaced apart bars extending across between said propelling means, said belt having an upper inclined flight and a lower slack flight, and a cleaning drum further along on said lower slack flight and comprising a pair of side bars pivotally and adjustably secured to the inside of said frame and having stub shafts, a tube riding very loosely on said stub shafts and extending across said belt above said belt's lower flight, a pair of rings, one at each end of said tube but larger than it and not connected to it, a series of flat bars extending widthwise across said rings and secured to them and extending radially with respect to said rings, and a helical bar connected to the inner periphery of said flat bars and to said rings and having an inner periphery greater than that of said tube so as to ride loosely thereon with considerably play, whereby said cleaning drum floats on said tube and its bars enter the spaces between successive bars of said conveyor.

6. In a tomato harvester, the combination of
a collecting conveyor upon which tomatoes fall along with dirt and trash, said conveyor having a main frame and an endless belt made up of propelling means at its sides and a series of parallel spaced apart bars extending across between said propelling means, said belt having an upper inclined flight and a lower slack flight, said belt and its bars having inner and outer surfaces, said conveyor having one bar omitted to give a space between the two bars at that location equal to twice the width of the normal space between bars plus the width of a said bar, and a resilient flexible, readily yielding flap secured to the inner surface of the bar on the forward side of the resultant space and with a free end resting loosely on top of the outer surface of the succeeding bar on the rear ends of the space during the upper run, said free end falling down during the lower run to open a large space between bars to let out accumulated trash, the flexibility and readiness to yield of said flap preventing injury to tomatoes, as does the securement of said flap to the inner surface of its said bar, while the securement there also prevents damage to said flap from objects coming against or rubbing against said flap, said ready yielding and said flexibility serving further to prevent permanent deformation and damage to said flap, which in turn would otherwise tend to damage said tomatoes.

7. In a tomato harvester, the combination of:
a collecting conveyor upon which tomatoes fall along with dirt and trash, said conveyor having a main frame and an endless belt comprising a series of parallel spaced-apart lateral bars, said belt having an inclined upper flight and a slack lower flight, said conveyor having one said bar omitted and a resilient flap secured to the bar on the forward side of the resultant space and bridging it and resting loosely on top of the succeeding bar on its passage along said upper flight, said flap falling down during said lower flight to open said space so that accumulated trash can fall out therethrough, a scraper blade that is V-shaped as seen in plan, extending across said belt and beneath it on said lower flight, means secured to said frame for holding said scraper blade yieldingly against said belt with the vertex forward and side portions extending rearwardly away therefrom, said scraper scraping off a layer of collected dirt from said belt, and a cleaning drum assembly supported rotatably with respect to said frame forward of said blade for later engagement with the lower flight of said belt, said drum having a plurality of radially extending flat lateral bars that enter the spaces between successive said conveyor bars and force out dirt from between them, said drum assembly comprising a pair of side bars pivotally and adjustably secured to the inside of said frame and having stub shafts, a tube riding very loosely on said stub shafts and extending across said belt above said belt's lower flight, a pair of rings, one at each end of said tube but larger than it and not connected to it, said flat lateral bars extending widthwise across said rings and secured to them and extending radially with respect to said rings, and a helical bar connected to the inner periphery of said flat lateral bars and to said rings and having an inner periphery greater than that of said tube so as to ride loosely thereon with considerable play.

8. In a tomato harvester, the combination of:

a collecting conveyor upon which tomatoes fall along with dirt and trash, said conveyor having a main frame and an endless belt comprising a series of parallel spaced-apart lateral bars, said belt having an inclined upper flight and a slack lower flight, a scraper blade that is V-shaped as seen in plan, extending across said belt with the V along the belt center and beneath it on said lower flight, the space bounded by the V and the space outside the V being open, means secured to said frame for holding said scraper blade yieldingly against said belt with the vertex forward and side portions extending rearwardly away therefrom, said scraper scraping off a layer of collected dirt from said belt, and a cleaning drum assembly supported rotatably with respect to said frame in between said flights and forward of said blade for later engagement with the lower flight of said belt, said drum having a plurality of radially extending flat lateral bars and gravity-actuated means for causing said lateral bars to enter down into the spaces between successive said conveyor bars and force out dirt from between them, whereby the outer surface of the lower flight of the belt is scraped off and the dirt stuck between conveyor bars that remains there after scraping is ejected downwardly by said drum assembly.

References Cited by the Examiner

UNITED STATES PATENTS

| | | | |
|---|---|---|---|
| 689,881 | 12/01 | Hoy | 198—230 |
| 721,725 | 3/03 | McCabe | 198—230 |
| 752,565 | 2/04 | Koneman | 198—229 |
| 1,550,365 | 8/25 | Jones | 198—229 X |
| 2,041,091 | 5/36 | Savy | 198—229 |
| 2,387,918 | 10/45 | Lockwood | 198—195 |
| 2,393,724 | 1/46 | Vickers | 198—230 |
| 2,551,123 | 5/51 | Heller | 198—230 |
| 2,906,393 | 9/59 | West | 198—67 |
| 3,027,994 | 4/62 | Lanham | 198—230 |
| 3,096,875 | 7/63 | Olson | 198—195 |

SAMUEL F. COLEMAN, *Primary Examiner.*

ERNEST A. FALLER, *Examiner.*